(12) United States Patent
Tandler et al.

(10) Patent No.: US 10,393,199 B2
(45) Date of Patent: Aug. 27, 2019

(54) PRESSURE GENERATOR FOR A HYDRAULIC VEHICLE BRAKING SYSTEM

(71) Applicant: Robert Bosch GmbH, Stuttgart (DE)

(72) Inventors: Juergen Tandler, Fuessen (DE); Matthias Mayr, Rettenberg (DE); Andreas Weh, Sulzberg (DE)

(73) Assignee: Robert Bosch GmbH, Stuttgart (DE)

(*) Notice: Subject to any disclaimer, the term of this patent is extended or adjusted under 35 U.S.C. 154(b) by 224 days.

(21) Appl. No.: 15/320,091

(22) PCT Filed: Apr. 27, 2015

(86) PCT No.: PCT/EP2015/059020
§ 371 (c)(1),
(2) Date: Dec. 19, 2016

(87) PCT Pub. No.: WO2015/197234
PCT Pub. Date: Dec. 30, 2015

(65) Prior Publication Data
US 2017/0130792 A1 May 11, 2017

(30) Foreign Application Priority Data
Jun. 27, 2014 (DE) .......................... 10 2014 212 409

(51) Int. Cl.
*F16D 65/16* (2006.01)
*B60T 13/66* (2006.01)
(Continued)

(52) U.S. Cl.
CPC ............ *F16D 65/16* (2013.01); *B60T 8/4018* (2013.01); *B60T 13/66* (2013.01); *B60T 13/74* (2013.01);
(Continued)

(58) Field of Classification Search
CPC .. F16D 2121/24; F16D 2125/40; F16D 65/16; F15B 15/068; F04B 9/02;
(Continued)

(56) References Cited

U.S. PATENT DOCUMENTS 7,681,961 B2    3/2010  Nonaga et al.
2002/0185340 A1  12/2002  Kojima
(Continued)

FOREIGN PATENT DOCUMENTS

DE  19851670 A1  5/2000
DE  10255198 A1  7/2003
(Continued)

OTHER PUBLICATIONS

International Search Report dated Sep. 11, 2015, of the corresponding International Application PCT/EP2015/059020 filed Apr. 27, 2015.

*Primary Examiner* — Abiy Teka
(74) *Attorney, Agent, or Firm* — Norton Rose Fulbright US LLP; Gerard Messina

(57) ABSTRACT

A pressure generator for a hydraulic power braking system. The pressure generator is designed to have a ball thread drive and a planetary gear, a spindle nut of the ball thread drive forming a planetary carrier for planetary wheels of the planetary gear. A sun wheel is non-rotatably fixed to a hollow shaft of an electric hollow shaft motor and together with the hollow shaft rotatably supported. The electric hollow shaft motor surrounds the ball thread drive and the planetary gear.

10 Claims, 1 Drawing Sheet

(51) Int. Cl.

| | |
|---|---|
| *B60T 13/74* | (2006.01) |
| *B60T 17/02* | (2006.01) |
| *H02K 7/06* | (2006.01) |
| *H02K 7/14* | (2006.01) |
| *B60T 8/40* | (2006.01) |
| *H02K 7/08* | (2006.01) |
| *H02K 7/116* | (2006.01) |
| *F04B 9/02* | (2006.01) |
| *F16D 121/04* | (2012.01) |
| *F16D 121/14* | (2012.01) |
| *F16D 121/24* | (2012.01) |
| *F16D 123/00* | (2012.01) |
| *F16D 125/06* | (2012.01) |
| *F16D 125/40* | (2012.01) |
| *F16D 125/50* | (2012.01) |

(52) U.S. Cl.
CPC ............ *B60T 13/741* (2013.01); *B60T 17/02* (2013.01); *F04B 9/02* (2013.01); *H02K 7/06* (2013.01); *H02K 7/08* (2013.01); *H02K 7/116* (2013.01); *H02K 7/14* (2013.01); *F16D 2121/04* (2013.01); *F16D 2121/14* (2013.01); *F16D 2121/24* (2013.01); *F16D 2123/00* (2013.01); *F16D 2125/06* (2013.01); *F16D 2125/40* (2013.01); *F16D 2125/50* (2013.01)

(58) Field of Classification Search
CPC .......... F04B 17/03; B60T 13/66; B60T 17/02; B60T 8/4018; H02K 7/08
See application file for complete search history.

(56) References Cited

U.S. PATENT DOCUMENTS

2004/0036370 A1\* 2/2004 Hilzinger .............. B60T 13/741
　　　　　　　　　　　　　　　　　　　　310/83
2006/0169548 A1\* 8/2006 Corbett ................... F16D 28/00
　　　　　　　　　　　　　　　　　　　　188/72.8

FOREIGN PATENT DOCUMENTS

| FR | 2860474 A1 | 4/2005 |
|---|---|---|
| GB | 2377740 A | 1/2003 |
| JP | 2003529725 A | 10/2003 |
| JP | 2005147170 A | 6/2005 |
| JP | 2007098969 A | 4/2007 |
| JP | 2010269795 A | 12/2010 |
| JP | 2012229741 A | 11/2012 |
| WO | 0111262 A1 | 2/2001 |
| WO | 02057124 A1 | 7/2002 |
| WO | 02099312 A1 | 12/2002 |
| WO | 2014086517 A1 | 6/2014 |

\* cited by examiner

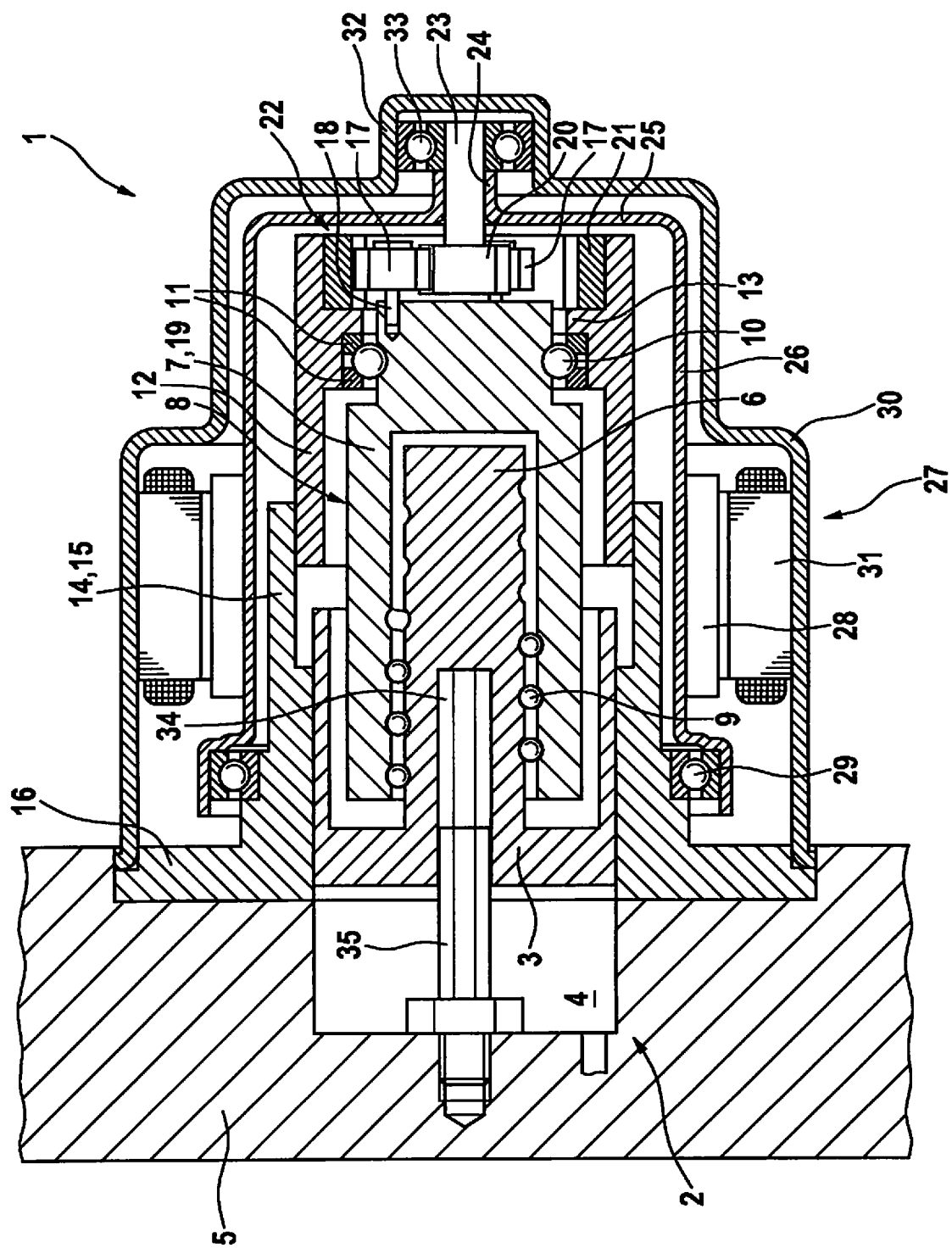

PRESSURE GENERATOR FOR A HYDRAULIC VEHICLE BRAKING SYSTEM

FIELD

The present invention relates to a pressure generator for a hydraulic vehicle braking system. The pressure generator is provided in particular for a power braking system; however, it may also be used, for example, for slip controllers.

BACKGROUND INFORMATION

Conventional helical gears have, for example, a spindle and a spindle nut, the internal thread of which is engaged with a thread of the spindle. A rotary drive of the spindle nut or of the spindle moves the other part, i.e., the spindle or the spindle nut, in an axial direction. Apart from those having sliding threads, there are also thread drives including rolling elements, for example, as ball thread drives or roller thread drives. Generally, the spindle nut or the spindle may also be regarded as a component of a helical gear which is rotatable, axially fixed and having a thread, and the other part, i.e., the spindle or the spindle nut may be regarded as a component of a helical gear which is axially movable, non-rotatable and having a counter-thread. The thread and the counter-thread are directly and indirectly engaged, for example, via rolling elements, so that a rotary drive of the rotatable component of the helical gear displaces the axially movable component in an axial direction.

Likewise, planetary gears are known which include a sun wheel and planetary wheels, which mesh with the sun wheel and rotate around the sun wheel in the presence of a rotary drive, and which include an annulus wheel enclosing the sun wheel concentrically, with which the planetary wheels also mesh and in which they rotate in the presence of a rotary drive and. The planetary wheels are situated eccentrically and rotatably on a planetary carrier, which is situated coaxially to the sun wheel and to the annulus wheel.

SUMMARY

A pressure generator in accordance with an example embodiment of the present invention includes a piston-cylinder unit including a cylinder and a piston which is movable in the cylinder. A movement of the piston in relation to the cylinder into the cylinder causes a hydraulic pressure to be built up and brake fluid to be displaced or conveyed. In the case of the pressure generator according to the present invention, the piston or the cylinder is connected to an axially movable component of a helical gear, so that a rotary drive of a rotatable component of the helical gear moves the axially movable component of the helical gear in an axial direction and moves the piston of the piston-cylinder unit in relation to the cylinder via the axially movable component. In this way, a hydraulic pressure may be generated and brake fluid displaced or conveyed.

For the rotary drive of the rotatable component of the helical gear, the pressure generator according to the present invention has a planetary gear, the rotatable component of the helical gear forming a planetary carrier of the planetary gear, according to the present invention. In particular, a spindle nut or generally a hollow part of the helical gear having an internal thread is suitable as a planetary carrier for the rotatable and eccentric attachment of the planetary wheels of the planetary gear at an identical distance from an axis of rotation.

Advantageous embodiments and refinements of the present invention are described herein.

In one refinement of the present invention, a hollow, for example, tubular tension connector, is provided in which the helical gear, at least a part of a length of the helical gear, and if necessary, the planetary gear in addition, is accommodated in a space-saving manner and which connects the helical gear to the piston-cylinder unit. The rotatable component of the helical gear is axially fixed to the tension connector and the cylinder, or the piston of the piston-cylinder unit is directly or indirectly connected to the tension connector via one or multiple components. The part of the piston-cylinder unit which is connected to the tension connector is not connected to the axially movable component of the helical gear. If the piston of the piston-cylinder unit generates a hydraulic pressure into the cylinder by a movement in relation to the cylinder, this causes a compressive force on the axially movable component of the helical gear, and as a reaction force a tensile force in the tension connector, which the tension connector transfers to the rotatable component of the helical gear which is axially fixed to the tension connector. Tensile and compressive forces, which have to be applied for pressure generation or act as reaction forces, are in this way contained as internal forces within the helical gear and the piston-cylinder unit, so that no forces act outwards.

For a compact design of the pressure generator, a refinement of the present invention provides that the piston of the piston-cylinder unit is designed as a hollow piston in which the axially movable component of the helical gear is situated coaxially. The helical gear may be situated at least partially in the hollow piston.

Likewise, for a compact design of the pressure generator, one refinement of the present invention provides an electric hollow shaft motor, which may be used to drive the planetary gear rotatably and in which the helical gear and/or the planetary gear are at least partially accommodated. "Partially" means, in particular with regard to the helical gear, that a part of a length of the helical gear is accommodated in the hollow shaft motor and the helical gear protrudes from the hollow shaft motor.

BRIEF DESCRIPTION OF THE DRAWINGS

Additional features of the present invention are described below in connection with the drawing. The individual features may be implemented each individually or in a plurality in any combination in specific embodiments of the present invention.

The FIGURE shows an axial section of a pressure generator according to the present invention.

DETAILED DESCRIPTION OF EXAMPLE EMBODIMENTS

Pressure generator 1 according to the present invention which is shown in the drawing is used for generating pressure in a hydraulic power braking system. Another possible use is for slip control. Pressure generator 1 has a piston-cylinder unit 2 including a piston 3 and a cylinder 4, which is designed as a cylindrical countersink in a hydraulic block 5 of the vehicle braking system, which is otherwise not shown. Hydraulic block 5 is used for the mechanical support and the hydraulic interconnection of hydraulic components of a slip control of the vehicle braking system, such as solenoid valves, check valves, hydraulic accumulators and piston-cylinder unit 2. Such hydraulic blocks 5 for slip-controlled vehicle braking systems are known and will not be described in detail here. In a power braking system, piston-cylinder unit 2 is used for a pressure build-up instead of a foot-operated or hand-operated master brake cylinder, which is used as a brake force setpoint generator for power braking and which may be used for generating a brake pressure for an emergency brake application in the event of a failure of the power brake.

Piston 3 of piston-cylinder unit 2 is designed as a hollow piston and has a spindle 6 situated in it coaxially and rigidly connected. Spindle 6 is situated coaxially in a spindle nut 7 which projects into piston 3 of hollow design. A rotary drive of rotatable and axially fixed spindle nut 7 causes spindle 6 and, with it, piston 3 to be moved axially, so that piston 3 generates a hydraulic pressure in cylinder 4. Together, spindle 6 and spindle nut 7 form a helical gear. In the depicted specific embodiment, the helical gear is designed as a ball thread drive including balls 9 as rolling elements, which roll in helical grooves which are formed as threads and counter-threads on spindle 6 and in spindle nut 7. Generally, spindle 6 and spindle nut 7 may be regarded as components of helical gear 8, spindle nut 7 forming a rotatable, axially fixed component of helical gear 8 having a thread and spindle 6 forming an axially movable, non-rotatable component of helical gear 8 having a counter-thread. In the specific embodiment as a ball thread, the thread of spindle nut 7 and the counter-thread of spindle 6 are indirectly engaged via balls 9, so that, as already described, a rotary drive of spindle nut 7 axially moves spindle 6 along with piston 3. In the case of specific embodiments of the present invention, also conceivable is a reversal, i.e., a rotatable and axially fixed spindle and a non-rotatable and axially movable spindle nut (not shown), the spindle nut being in this case connected to piston 3 in one piece, for example, and moving it in the case of a rotary drive of the spindle.

Spindle nut 7 is rotatably supported on a pivot bearing 10 and is held axially fixed. In the specific embodiment, pivot bearing 10 is situated on an end of spindle nut 7 remote from piston 3 and is designed as a four-point bearing. Bearing rings 11 of pivot bearing 10 of spindle nut 7 designed as a four-point bearing are situated in a bearing retainer of a tubular tie anchor 12, one of two bearing rings 11 being supported axially on a collar 13 inside tie anchor 12. Collar 13 may also be regarded as an axial counter bearing for pivot bearing 10 of spindle nut 7. Tubular tie anchor 12 is fixedly connected to a tubular collar 14 of a flange part 15 which has a flange 16 which is fastened in a countersink of hydraulic block 5. Flange part 15 is coaxial to cylinder 4, piston 3, spindle 6 and spindle nut 7; collar 14 of flange part 15 guides piston 3 in an axially movable manner. In the specific embodiment, tubular tie anchor 12 is rigidly connected to collar 14 or flange part 15 by pressing into collar 14. Other connections are possible. If piston 3 is pushed into cylinder 4 for generating the pressure, a compression force acts on spindle 6 and on spindle nut 7, which is supported axially via pivot bearing 10 on collar 13 in the interior of tie anchor 12. Tie anchor 12 is fixedly connected to flange part 15 and it, in turn, is connected to hydraulic block 5, so that a tensile force, which occurs as a reaction force to the compressive forces in spindle 6 and in spindle nut 7, is introduced directly via tie anchor 12, collar 14 and flange 16 of flange part 15 into hydraulic block 5 which has cylinder 4. The compression and tensile forces occurring during the pressure generation are in this way guided on a short path as internal forces in a closed circle, so that no forces are exerted outwards, which must be supported.

On its end remote from piston 3, spindle nut 7 has three planetary wheels 17, which are situated rotatably on spindle nut 7 using pins 18. In this way, spindle nut 7 forms a planetary carrier 19 for planetary wheels 17. Planetary wheels 17 mesh with a coaxially situated sun wheel 20 and a likewise coaxial annulus wheel 21, which surrounds planetary wheels 17. On a side of collar 13 facing away from pivot bearing 10 of spindle nut 7, annulus wheel 21 is pressed into tubular tie anchor 12, i.e., annulus wheel 21 is non-rotatable. Planetary wheels 17, sun wheel 20 and annulus wheel 21 form a planetary gear 22 of pressure generator 1 according to the present invention, which is used for a rotary drive of spindle nut 7.

Sun wheel 20 is non-rotatably fixed to a shaft 23, which is pressed into a collar 24 in an end wall 25 of a cup-shaped hollow shaft 26 of an electric hollow shaft motor 27. Hollow shaft 26 has external poles or permanent magnets 28 and may also be regarded as a rotor of electric hollow shaft motor 27. Hollow shaft 26 concentrically surrounds planetary gear 22, helical gear 8, tie anchor 12 and collar 14 of flange part 15. Close to flange 16, it is rotatably supported on a ball bearing as pivot bearing 29.

Electric hollow shaft motor 27 has a likewise cup-shaped and stepped-diameter motor housing 30, the open end of which is attached to flange 16 of flange part 15. On one internal side, housing 30 has electromagnets as stator magnets 31. Motor housing 30 including stator magnets 31 may also be regarded as a stator of electric hollow shaft motor 27. On a closed end facing away from flange 16, a hollow cylindrical bearing retainer 32 is formed on motor housing 30, in which a ball bearing is situated as pivot bearing 33. Shaft 23 is supported rotatably using pivot bearing 33, fixed non-rotatably to sun wheel 20 of planetary gear 22 and which is fixed non-rotatably to hollow shaft 26 by being pressed into collar 24 of hollow shaft 26. Consequently, pivot bearing 23 rotatably supports hollow shaft 26 of hollow shaft electric motor 27 on the end remote from flange 16 and, simultaneously, sun wheel 20 of planetary gear 22. In the case of a rotary drive of hollow shaft 26 of electric hollow shaft motor 27, sun wheel 20 of planetary gear 22, which is non-rotatable in relation to hollow shaft 26, is driven rotationally and drives planetary wheels 17 to a rotational movement, which causes spindle nut 7 to be driven rotationally, which, as described, simultaneously forms planetary carrier 19 of planetary gear 22.

To prevent rotation, piston 3 and spindle 6 have an axial blind hole 34 having a hexagonal cross section, into which a hexagonal rod 35 protrudes, which is screwed non-rotatably into hydraulic block 5 on the bottom of cylinder 4.

What is claimed is:

1. A pressure generator for a hydraulic braking system, comprising:
   a helical gear, which has a rotatable, axially fixed component having a thread, and an axially movable, non-rotatable component having a counter-thread, the counter-thread of which engages the thread of the rotatable component, so that a rotary drive of the rotatable component moves the axially movable component in an axial direction, having a planetary gear for a rotary drive of the rotatable component of the helical gear; and
   a piston-cylinder unit including a cylinder, and a piston which is movable in the cylinder, one of the piston or the cylinder being connected to the axially movable component of the helical gear, so that a rotary drive of the rotatable component of the helical gear moves the piston of the piston-cylinder unit in relation to the cylinder via the axially movable component of the helical gear, and that the rotatable component of the helical gear forms a planetary carrier of the planetary gear;
wherein the cylinder is in a hydraulic block of the hydraulic braking system.

2. The pressure generator as recited in claim 1, wherein the pressure generator has a hollow tension connector in which the helical gear is accommodated, to which are connected the rotatable component of the helical gear in an axially fixed manner and the cylinder or the piston of the piston-cylinder unit.

3. The pressure generator as recited in claim 2, wherein an annulus wheel of the planetary gear is situated non-rotatably in the tension connector.

4. The pressure generator as recited in claim 1, wherein the piston of the piston-cylinder unit is a hollow piston and the axially movable component of the helical gear is situated coaxially in the piston.

5. The pressure generator as recited in claim 1, wherein the piston of the piston-cylinder unit is at least one of: i) axially movable in the cylinder of the piston-cylinder unit, and ii) guided to a part situated on the cylinder of the piston-cylinder unit.

6. The pressure generator as recited in claim 1, wherein the pressure generator has an electric hollow shaft motor for the rotary drive of the planetary gear, in which at least one of the helical gear, and the planetary gear, is at least partially accommodated.

7. The pressure generator as recited in claim 6, wherein a sun wheel of the planetary gear is non-rotatably fixed to a hollow shaft of the electric hollow shaft motor.

8. The pressure generator as recited in claim 1, wherein the electric hollow shaft motor has a cup-shaped hollow shaft including a pivot bearing on an outer side of an end wall.

9. The pressure generator as recited in claim 1, wherein the cylinder is a cylindrical countersink in the hydraulic block of the hydraulic braking system.

10. The pressure generator as recited in claim 9, wherein a rod having a polygonal cross section is non-rotatably fixed on a bottom of the cylindrical countersink; and wherein the piston has an axial blind hole having a polygonal cross section into which the rod protrudes, the rod preventing rotation of the piston.

* * * * *